SERIES ELECTRONIC SWITCH

Filed March 13, 1950

INVENTOR
J. H. FELKER
BY William F. Simpson.
ATTORNEY

Patented Oct. 9, 1951

2,570,225

UNITED STATES PATENT OFFICE 2,570,225

SERIES ELECTRONIC SWITCH

Jean H. Felker, Livingston, N. J., assignor to Bell Telephone Laboratories, Incorporated, New York, N. Y., a corporation of New York Application March 13, 1950, Serial No. 149,422

2 Claims. (Cl. 250—27)

This invention relates to an electronic switch which may be employed to interconnect an input and an output terminal under control of a switching or control voltage.

An object of the present invention is to provide an improved electronic switch capable of operating from direct or continuous current transmission up to and including the extremely high frequencies.

A further object of this invention is to provide an electronic switch wherein the switching voltage is not repeated or relayed to the output circuit and in which substantially no transients are developed in the output circuit incident to the operation of the electronic switch or incident of the application to switching voltages thereto.

Electronic switches or clamping circuits of the prior art are either of a shunt type in which the transmission path through the device is short-circuited when transmission is interrupted or a series type which usually employs transformers which are incapable of operating at very low frequencies or direct current. Each of these arrangements has numerous disadvantages. Transformers have high capacity to ground and are not operable for direct or unvarying current or for very low frequencies. The shunt type imposes a considerable load or impedance on the input circuit which frequently produces an undesirable reaction on the input circuit or device. Furthermore, if more than one are connected to the input circuit the operation of any one of the switches affects the input circuit and thus the output of any of the other switches.

Also many of the electronic switching arrangements of the prior art either produce transients at the beginning or ending of the switching period or else the output comprises a combination of both the input voltage and the switching voltage or a combination of all of the above effects.

In accordance with the present invention the foregoing limitations and defects are substantially eliminated. The input circuit comprises the input circuit of a cathode follower type of tube circuit which is provided with additional feedback thus tending to prevent transients from appearing in the output circuit and in addition the circuit constants are so chosen that the transmission from the switching voltage to the output circuit is reduced to substantially zero.

Figure 1:
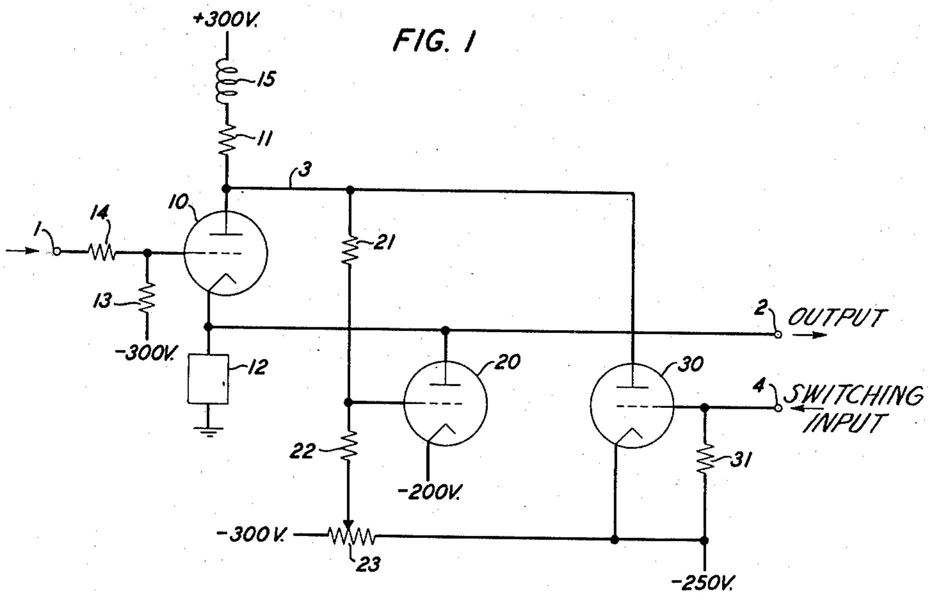
Figure 2:
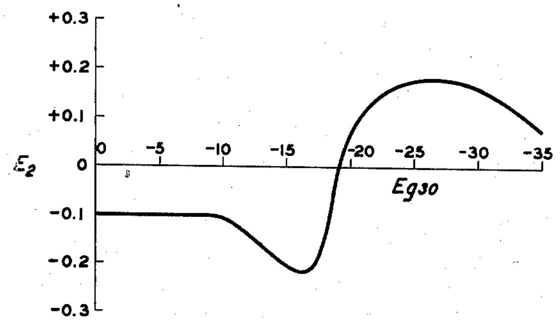

The foregoing objects and features of this invention, the novel features of which are specifically set forth in the claims appended hereto, may be more readily understood from the following description of an exemplary embodiment when read with reference to the attached drawings in which:

Fig. 1 shows the detailed circuit of an exemplary switching circuit embodying this invention; and Fig. 2 shows the effect of the switching voltage on the output for optimum values of certain of the circuit constants.

The following description of an exemplary embodiment of the invention employs three high vacuum electronic tubes. As shown in Fig. 1 these tubes are all three-element tubes comprising an anode, a cathode and a control element. The invention, however, is not limited to the use of three-element tubes. Other multielement and multicontrol-element tubes may be used in the positions of the second and third tubes with the well understood and appropriate circuit connections and modifications. Furthermore, any combination of tubes having different numbers of elements or control elements may be employed; that is, all of the tubes need not have the same number of elements. Tubes having more than three elements may be substituted for the second or third tubes shown in Fig. 1.

As shown in Fig. 1, input signals are applied to terminal 1 and these are coupled through a coupling network comprising resistors 14 and 13 to the control element of the first tube 10. Tube 10 comprises a high vacuum tube having an impedance element 12 connected to its cathode and impedance means comprising resistor 11 and inductance 15 connected in series to the anode of tube 10. The resistor 11 is the usual plate or output resistance or impedance element of the tube, while inductance 15 is provided to neutralize, in part at least, the output or plate capacity of the tube to ground, as well as part of the distributed or stray capacity of the wiring. Other suitable anode impedance elements may be employed when desired.

The impedance element 12 will usually comprise a resistor. However, other forms of impedance elements may be provided comprising networks of any desired degree of complexity. A second common form of impedance element 12 comprises a condenser when it is desired to sample the input wave and store the magnitude of the sample between sampling times. The impedance element 12 may comprise a condenser for other purposes when desired.

A second high vacuum electronic tube 20 is provided having its anode-cathode path in parallel with the impedance element 12 so far as the alternating-current voltages, i. e., changes in voltage of the cathode of tube 10 or across impedance element 12, are concerned. The cathode of tube 20 is connected to a source of negative voltage; that is, the cathode of tube 20 is connected to a voltage source which is negative with respect to ground or at least negative with respect to the lower end of the impedance means 12.

When it is desired to operate the switching circuit to repeat or not repeat voltages or pulses of relatively long duration, which are substantially equivalent to unvarying or direct current, it is necessary to connect the control element of the second tube 20 to the anode of tube 10 by means of a direct connection. As shown in the drawing, this direct connection comprises resistors 21 and 22 which form a voltage divider and apply to the control element of tube 20 a fraction of the voltage of the anode of tube 10. Any suitable form of direct-coupled network or other suitable coupling networks may be substituted for the network comprising resistors 21 and 22 which will pass the desired frequency range of currents or voltages developed on the anode of tube 10. The lower end of resistor 22 is connected to a potentiometer 23 which in turn is connected to two negative voltages, namely, negative 300 and negative 250 with respect to ground in the specific exemplary embodiment shown in the drawing. The potentiometer 23 is adjusted to control the bias applied to the grid of tube 20 which in turn controls the bias or reference voltage of the output terminal 2. The output circuit is connected to terminal 2 which in turn is connected to the cathode of tube 10 and the anode of tube 20.

A third high vacuum electronic tube 30 is provided for controlling the operation of tubes 10 and 20. The anode of tube 30 is connected to the anode of tube 10. Consequently, the impedance network comprising elements 11 and 15 connected to the anode of tube 10 serves also as the impedance element for the anode of tube 30. Tube 30 is provided with a substantially zero bias since the grid is connected through resistor 31 to the cathode of this tube. The cathode of tube 30 is connected to a voltage more negative than the voltage of the cathode of tube 10, that is, more negative than the voltage of the lower terminal of the impedance means or network 12. As a result of the above-described connections a relatively large current normally flows in the anode-cathode circuit of tube 30 which current produces a large voltage drop across the impedance means or network connected to the anode of tubes 30 and 10, with the result that the voltage of this point falls to a relatively low value and when desired may fall even below the ground potential. When the voltage of the anode of tube 10 is at this low value substantially no current flows in the anode-cathode of either tube 10 or tube 20 so that these tubes do not operate as amplifier tubes. Consequently, at this time substantially no voltage appears at the output terminal 2 because no current will flow through either tubes 10, 20 or the impedance network 12. Any such voltage as may appear on the output terminal 2 at this time will probably be due to crosstalk, leakage or other spurious currents or effects. Likewise, the input element of tube 10 at this time has an extremely high impedance so long as it is negative with respect to the cathode of tube 10. Consequently, tube 10 provides substantially no load on the input circuit at this time. As shown in Fig. 1, a voltage dividing network comprising resistors 14 and 13 has been arranged to insure that a negative small bias is applied to the control element of tube 10 at this time in the absence of any input signals, that is, even though the input terminal 1 may be grounded. Of course, any suitable incoming coupling network may be provided in place of the network comprising resistors 14 and 15 and any desired bias may be applied to the control element of tube 10 depending upon the type of circuit operation desired, as well as the type of tube selected for tube 10 and other requirements of the circuits and tubes.

Thus, as long as tube 30 is conducting, a circuit path from terminal 1 to terminal 2 is interrupted by an extremely high impedance and the input circuit of the arrangement shown in Fig. 1 has a high impedance so that it will not impose any appreciable load on terminal 1. Likewise, substantially no potential appears at the output of terminal 2. Such an arrangement is analogous to a series relay contact which is open.

When it is desired to repeat voltages from terminal 1 to terminal 2 a negative voltage is applied to the control element of tube 30, thus reducing or interrupting the current flow in the anode-cathode path of this tube. As a result, the voltage of conductor 3 and thus the voltage of the anode of tube 10 rise to an operating voltage for the circuit comprising tubes 10 and 20 with the result that current flows in the anode-cathode circuit of both tubes 10 and 20. The magnitude of current flowing in these circuits at this time is controlled by the voltage applied to terminal 1 by the incoming signal or any other voltage applied to terminal 1. As a result, substantially the same voltage appears on terminal 2 and any variations in the voltage of terminal 1 are repeated with high fidelity to terminal 2. At this time it should be noted that tube 10 operates as a cathode follower due to the impedance network 12 connected in its output circuit. As a result, the input impedance of the control element of tube 10 remains extremely high, but due to the impedance transforming character of cathode follower circuits the output impedance of tube 10 is relatively low. This output impedance is further reduced by tube 20. Tubes 10 and 20 and the coupling between them form a feedback loop in which the gain of the combination from terminal 1 to terminal 2 is substantially unity at this time.

As pointed out above, the input impedance of tube 10 remains high at this time so that it applies substantially no load to the input terminal 1. At the same time a relatively low impedance is applied to terminal 2. Such operation is somewhat analogous to a relay having a substantially infinite input impedance and a low output impedance which is closed when proper potential is applied to the input terminal.

By providing the circuit connections described above, the opening and closing of the path for repeating the voltage applied to terminal 1 to terminal 2 can be operated from substantially direct current to extremely high frequencies which frequencies are largely determined by the tube and circuit parameters of amplifiers as is well understood by persons skilled in the art. This frequency limit may be of the order of 10 to 100 or more megacycles. Furthermore, for the gating, clamping, and for distributors and similar electronic devices, a plurality of devices of the type shown in Fig. 1 may be connected in parallel with terminal 1 which in turn may be connected to the output circuit of any source of signals, amplifiers, or repeaters, as is well understood by persons skilled in the art. Inasmuch as the input impedance of each of the devices is extremely high due to the cathode follower action of the input tube substantially no interference is encountered between said multiple connections.

In switching devices of the type disclosed it is desirable that the switching voltage applied to the grid of tube 30 should not be added to or subtracted from or in any way affect or appear in the output circuit that is on terminal 2. In analyzing the operation of the circuit in operation in repeating voltages from terminal 1 to terminal 2 and also the effect of switching voltages applied to the control element of tube 30, it is convenient to write nodal equations for points 2 and 3.

At node 2

$$E_2(G_{p10}+G_{p20}+G_{12})-E_3G_{p10}$$
$$=G_{m10}E_{g10}-G_{m20}E_{g20}$$
$$=G_{m10}(E_1-E_2)-kG_{m20}E_3$$

or $$E_2(G_{m10}+G_{p10}+G_{p20}+G_{12})+E_3(kG_{m20}-G_{p10})=G_{m10}E_1 \quad (1)$$

where $$k=\frac{R_{22}}{R_{21}+R_{22}} \quad (2)$$

From Equation 1, with $E_1=0$ $$\frac{E_2}{E_3}=\frac{G_{p10}-kG_{m20}}{G_{m10}+G_{p10}+G_{p20}+G_{12}}=\frac{1-kG_{m20}R_{p10}}{1+\mu_1+R_{p10}\left(\frac{1}{R_{12}}+\frac{1}{R_{p20}}\right)} \quad (3)$$

The ratio of $$\frac{E_2}{E_3}$$

approaches zero when $$1-kG_{m20}R_{p10}=0$$

or $$k=\frac{1}{\mu_{10}}\frac{G_{m10}}{G_{m20}} \quad (4)$$

where $E_1$=voltage at terminal 1
$E_2$=voltage at terminal 2
$E_3$=voltage at terminal 3
$E_{g10}$=voltage at terminal of grid of tube 10
$E_{g20}$=voltage at terminal of grid of tube 20
$G_{p10}$=anode-cathode admittance of tube 10
$G_{p20}$=anode-cathode admittance of tube 20
$G_{m10}$=mutual conductance of tube 10
$G_{m20}$=mutual conductance of tube 20
$G_{11}$=admittance of elements 11 and 15 and related circuit elements
$G_{12}$=admittance of elements 12
$R_{21}$=magnitude of resistor 21
$R_{22}$=magnitude of resistor 22

From the above equations it is apparent that the effect of the voltage of point 3 upon the output circuit of terminal 2 may be reduced in two ways. In other words, the effect of the applied switching voltage to the control element of tube 30 which in turn controls the voltage of point 3 as described above may be reduced first by making the denominator of the fraction of Equation 3 large. This is accomplished by the feedback action of the circuit in which the feedback voltage should be large or the gain around the feedback path, i. e., $\mu\beta$ is large.

A second way of reducing the coupling between the output circuit and the applied switching voltage is to make the numerator of the fraction of Equation 3 zero. In other words, the coupling may be reduced by properly choosing the ratio between resistors 21 and 22 of the coupling circuit between tubes 10 and 20. If these resistors are so chosen that the ratio of the voltage applied to the grid of tube 20 to the voltage at the anode of tube 10 is substantially equal to the ratio of the mutual conductance of tube 10 to the mutual conductance of tube 20 divided by the voltage amplification factor of tube 10, the coupling between tube 30 and terminal 2 approaches zero.

The above equations and mathematics are based on the assumption that the tubes are operated over their linear regions. However, for switching circuits, the tubes are operated at all times over substantially their entire operating range which makes use of the non-linear portions of their curves. In other words, tube 30 is at one time conducting substantially a maximum current and at other times is conducting substantially no current. Consequently, the above equations may not be rigorous. However, Fig. 2 shows that the coupling between the switching voltage and the output circuit of terminal 2 has been reduced to substantially zero. In this case tubes 10 and 20 comprise the two sections of a twin-triode of a tube designated 12AX7 by the Radio Corporation of America. Tube 30 is one section of a twin-triode tube designated 12AU7 by the Radio Corporation of America. When the ratio between resistors 21 and 22 is selected in accordance with the above Equation 4, Fig. 2, shows the voltage appearing on terminal 2 with terminal 1 grounded as the switching voltage applied to the control element of tube 30 varies from approximately zero to approximately −35 volts. At this time the voltage on the anode of tube 10 varies over a range of several hundred volts. However, as shown in Fig. 2, the voltage variation of terminal 2 at this time is less than four-tenths of a volt, that is, from −0.2 to +0.2. It is thus apparent, that the coupling between the switching tube or voltages and the output circuit has been reduced to substantially zero.

What is claimed is:

1. In combination, a first multielement vacuum tube comprising an anode, a cathode and a control element, an input circuit connected to said control element, an impedance element connected to the anode of said first tube, another impedance element connected to the cathode of said tube, a second multielement vacuum tube comprising an anode, a cathode and a control element, a coupling network connecting said control element of said second tube to the anode of said first tube, a connection between the cathode of said first tube and the anode of said second tube, an output circuit connected to said cathode of said first tube and to said anode of said second tube, a third multielement electronic tube comprising an anode, a cathode and a control element, connections between the anode of said first tube and the anode of said third tube, and means for applying a switching voltage to the control element of said third tube.

2. In combination, a first multielement electronic tube comprising an anode, a cathode and a control element, an input circuit connected to the control element of said first tube, impedance means connected to the anode of said first tube, other impedance means connected to the cathode of said first tube, a second multielement electronic tube comprising an anode, a cathode and a control element, a connection between the cathode of said first tube and the anode of said second tube, an output circuit connected to the cathode of said first tube and the anode of said second tube, a third multielement electronic switching tube comprising an anode, a cathode and a control element, a connection between the anode of said first and third tubes, means for applying a switching voltage to the control element of said third tube, a network for substantially preventing said switching voltage from appearing in said output circuit comprising a network connected between the anode of said first tube and the control element of said second tube having a voltage divider for applying that fraction of the voltage of the anode of the first tube to the control element of the second tube which is equal to the ratio of the mutual conductance of the first tube to the mutual conductance of the second tube divided by the amplification factor of said first tube.

JEAN H. FELKER.

No references cited.